United States Patent
Kurita et al.

(10) Patent No.: US 7,777,772 B2
(45) Date of Patent: Aug. 17, 2010

(54) LASER PROCESSING DEVICE

(75) Inventors: Norio Kurita, Hamamatsu (JP); Naoki Uchiyama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 743 days.

(21) Appl. No.: 10/582,332

(22) PCT Filed: Dec. 6, 2004

(86) PCT No.: PCT/JP2004/018157

§ 371 (c)(1),
(2), (4) Date: Apr. 2, 2007

(87) PCT Pub. No.: WO2005/056229

PCT Pub. Date: Jun. 23, 2005

(65) Prior Publication Data

US 2008/0019405 A1    Jan. 24, 2008

(30) Foreign Application Priority Data

Dec. 12, 2003  (JP) .............................. 2003-415142

(51) Int. Cl.
B41J 2/44  (2006.01)
B23K 26/02  (2006.01)
(52) U.S. Cl. ...................................... 347/224
(58) Field of Classification Search ................. 347/224, 347/245, 263
See application file for complete search history.

(56) References Cited

U.S. PATENT DOCUMENTS

| 5,580,471 | A | 12/1996 | Fukumoto et al. |
| 6,332,276 | B1 | 12/2001 | Mangel |
| 7,595,895 | B2 * | 9/2009 | Kurita et al. ................. 356/614 |
| 7,626,746 | B2 * | 12/2009 | Kurita et al. ................. 359/236 |
| 2003/0072335 | A1 | 4/2003 | Momiuchi et al. |
| 2003/0085987 | A1 | 5/2003 | Kataoka et al. |
| 2007/0273950 | A1 * | 11/2007 | Kurita et al. ................. 359/236 |

FOREIGN PATENT DOCUMENTS

EP    1 180 836    2/2002

(Continued)

OTHER PUBLICATIONS

International Preliminary Search Report in PCT/JP04/016340 dated Jul. 24, 2006.*

(Continued)

*Primary Examiner*—Huan H Tran
(74) *Attorney, Agent, or Firm*—Drinker Biddle & Reath LLP (57) ABSTRACT

In the laser processing apparatus 1, a laser head 13 is held and cooled by a cooling jacket 11, and thus can be operated stably. Also, even if the emitting direction of laser light L fluctuates when replacing the laser head 13 because of its damage or the like, a regulator 15 can adjusts the position and inclination of the cooling jacket 11 with respect to an optical system main part 4, so that the emitting direction of the laser light L can coincide with the optical axis of the optical system main part 4. Thus, the laser processing apparatus 1 can easily correct the fluctuation in the laser light emitting direction among the laser heads 13.

1 Claim, 8 Drawing Sheets

FOREIGN PATENT DOCUMENTS

| | | | |
|---|---|---|---|
| JP | 2-207992 | | 8/1990 |
| JP | 03-189086 | * | 8/1991 |
| JP | 05-245675 | | 9/1993 |
| JP | 05-261575 | | 10/1993 |
| JP | 07-116878 | | 5/1995 |
| JP | 8-335732 | | 12/1996 |
| JP | 09-277074 | | 10/1997 |
| JP | 10-34368 | * | 2/1998 |
| JP | 2002-118319 | | 4/2002 |
| JP | 2003-158315 | | 5/2003 |
| JP | 3708102 | | 8/2005 |
| WO | WO 2005/056229 | * | 6/2005 |
| WO | WO 2005/068126 | * | 7/2005 |

OTHER PUBLICATIONS

K. Hayashi; "Inner Glass Marking by Harmonics of Solid-State Laser", Proceedings of 45$^{th}$ Laser Materials Processing Conference, Dec. 1998, pp. 23-28.

K. Miura et al., "Formation of Photo-Induced Structures in Glasses with Femtosecond Laser", Proceedings of 42$^{nd}$ Laser Materials Processing Conference, Nov. 1997, pp. 105-111.

T. Sano et al., "Evaluation of Processing Characteristics of Silicon with Picosecond Pulse Laser", Preprints of the National Meeting of Japan Welding Society, No. 66, Apr. 2000, pp. 72-73 (with at least partial English translation).

* cited by examiner

LASER PROCESSING DEVICE

This application is a national stage application of international application number PCT/JP04/18157, filed on Dec. 6, 2004.

TECHNICAL FIELD

The present invention relates to a laser processing apparatus which processes a subject to be processed by irradiating it with laser light.

BACKGROUND ART

Known as a conventional laser processing apparatus is one disclosed in Patent Document 1. In the laser processing apparatus disclosed in this publication, a laser head is disposed above a stage for mounting a subject to be processed, such that the emitting direction of laser light emitted from the laser head is perpendicular to the stage.

Such a configuration is employed because, when the laser head is disposed such that the laser light emitting direction is parallel to the stage, a reflecting mirror is necessary for emitting the laser light perpendicularly to the stage, which complicates the structure. Further, since the reflecting mirror receives the laser light, there is a fear of thermal distortions occurring in the reflecting mirror, thereby changing characteristics of the laser light.

Patent Document 1: Japanese Patent Application Laid-Open No. HEI 5-245675

DISCLOSURE OF THE INVENTION

Problem to be Solved by the Invention

However, the following problem exists in laser processing apparatus such as the one mentioned above. Namely, the emitting direction of laser light emitted from laser heads slightly varies among the laser heads. Therefore, when a laser head is replaced because of its damage or the like, there is a fear of the laser light emitting direction deviating from the optical axis of the laser processing apparatus main part because of the fluctuation in laser light emitting direction among laser heads. Such a deviation in laser light emitting direction may become a serious problem when finely processing a subject to be processed upon irradiation with laser light.

In order to solve such a problem, it is an object of the present invention to provide a laser processing apparatus which can correct the fluctuation in laser light emitting direction among laser heads.

Means for Solving Problem

The present invention provides a laser processing apparatus for processing a subject to be processed by irradiating the subject with laser light, the apparatus comprising a laser head for emitting laser light; a cooling jacket for holding and cooling the laser head; an optical system main part for adjusting the laser light emitted from the laser head to a predetermined characteristic; and a regulator, disposed between the cooling jacket and optical system main part, for adjusting a position and inclination of the cooling jacket with respect to the optical system main part.

In this laser processing apparatus, the laser head is held and cooled by the cooling jacket, and thus can be operated stably. Also, even if the laser light emitting direction fluctuates when replacing the laser head because of its damage or the like, the regulator can adjust the position and inclination of the cooling jacket with respect to the optical system main part, so that the laser light emitting direction can coincide with the optical axis of the optical system main part in this laser processing apparatus. Thus, this laser processing apparatus can easily correct the fluctuation in laser light emitting direction among laser heads.

Preferably, the cooling jacket holds and cools a shutter unit for opening and closing an optical path of the laser light emitted from the laser head. This configuration allows the cooling jacket for cooling the laser head to cool the shutter unit having generated heat by closing the optical path of the laser light. Thus, the same cooling jacket can efficiently cool both of the laser head and shutter unit, and reduce the size of the laser processing apparatus.

Preferably, the optical system main part comprises a beam expander for adjusting a beam size of the laser light emitted from the laser head, a subject observation optical system for observing the subject, and a processing objective lens for converging the laser light onto and within the subject. This configuration allows the beam expander to adjust the beam size of the laser light emitted from the laser head, the subject observation optical system to observe the subject, and the processing objective lens to converge the laser light onto and within the subject, thereby processing the subject.

EFFECT OF THE INVENTION

The present invention can correct the fluctuation in laser light emitting direction among laser heads.

EXPLANATION OF NUMERALS

1 . . . laser processing apparatus, 4 . . . optical system main part, 11 . . . cooling jacket, 13 . . . laser head, 14 . . . shutter unit, 15 . . . regulator, 22 . . . beam expander, 42 . . . processing objective lens, L . . . laser light, S . . . subject.

BEST MODES FOR CARRYING OUT THE INVENTION

In the following, with reference to the drawings, preferred embodiments of the laser processing apparatus in accordance with the present invention will be explained in detail.

Figure 1:
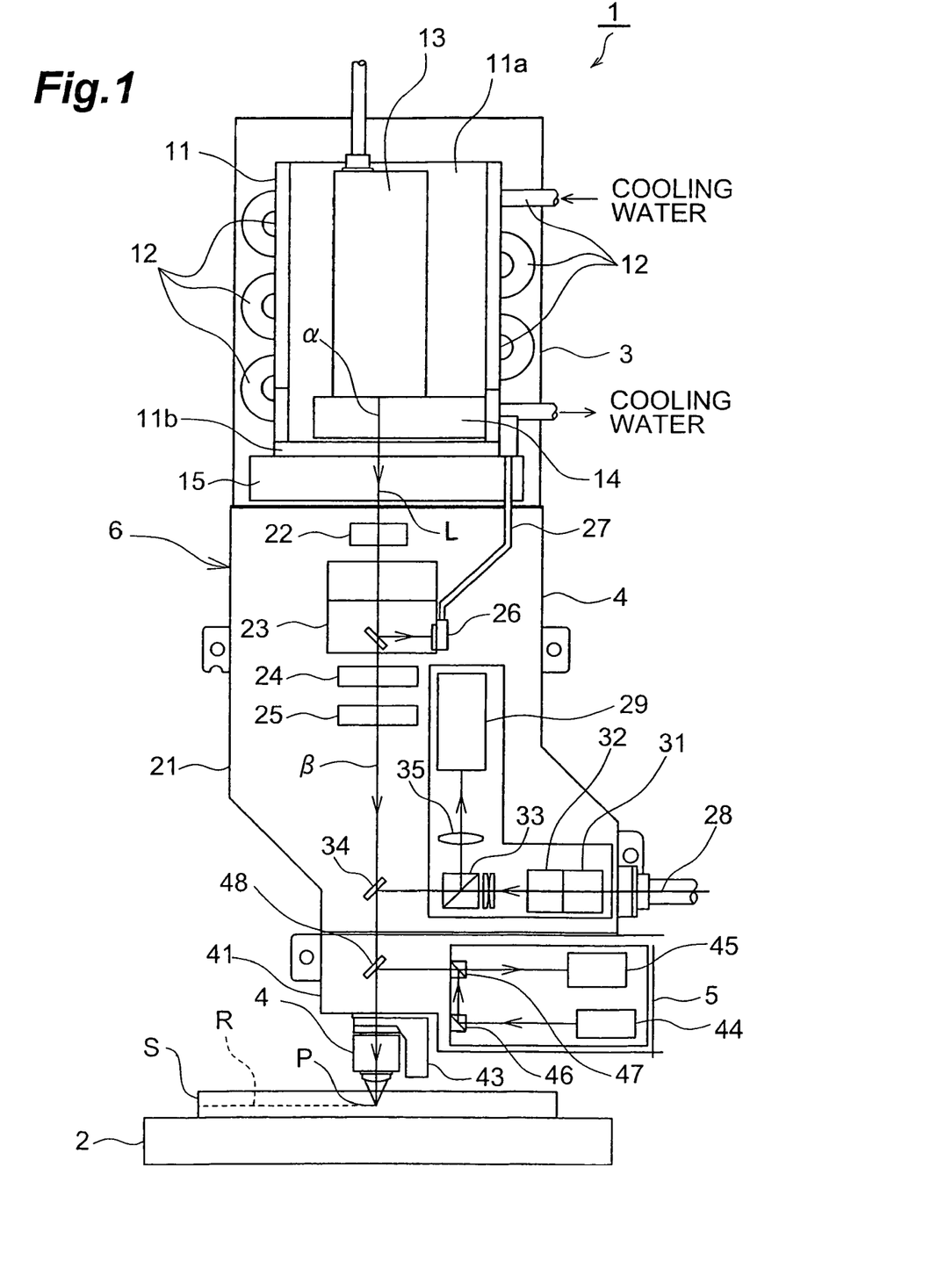
FIG. 1 is a schematic diagram showing an embodiment of the laser processing apparatus in accordance with the present invention.

FIG. 1 is a schematic diagram showing an embodiment of the laser processing apparatus 1 in accordance with the present invention. As shown in FIG. 1, the laser processing apparatus 1 is an apparatus which irradiates a planar subject S to be observed, which is mounted on a stage 2, while positioning a light-converging point P within the subject S, thereby forming a modified region R caused by multiphoton absorption within the subject S. The stage 2 is adapted to move up and down and left and right and rotate, whereas a laser outputting apparatus 6 mainly constituted by a laser head unit 3, an optical system main part 4, and an objective lens unit 5 is disposed above the stage 2.

The laser head unit 3 is detachably attached to the upper end portion of the optical system main part 4. The laser head unit 3 includes an L-shaped cooling jacket 11, whereas a cooling pipe 12 through which cooling water circulates is buried in a vertical wall 11a of the cooling jacket 11 while in a winding state. A laser head 13 for emitting laser light L downward and a shutter unit 14 for selectively opening and closing an optical path of the laser light L emitted from the laser head 13 are detachably attached to the front face of the vertical wall 11a by screws. Therefore, the laser head 13 can be replaced when damaged. Also, the same cooling jacket 11 can efficiently cool the laser head 13, which generates heat when driven, and the shutter unit 14, which generates heat when the optical path of the laser light L is closed, while reducing the size of the laser processing apparatus 1. The laser head 13 uses an Nd:YAG laser, for example, and emits pulsed laser light having a pulse width of 1 µs or less as the laser light L.

A regulator 15 for adjusting the position and inclination of the cooling jacket 11 is attached to the lower face of a bottom wall 11b of the cooling jacket 11 in the laser head unit 3. The regulator 15 is used in order for the optical axis α of the laser light L emitted from the laser head 13 to coincide with an optical axis β set in the optical system main part 4 and objective lens unit 5 so as to extend vertically. Namely, the cooling jacket 11 of the laser head unit 3 is attached to the optical system main part 4 by way of the regulator 15. When the regulator 15 adjusts the position and inclination of the cooling jacket 11 thereafter, the position and inclination of the laser head 13 is also adjusted in conformity to the movement of the cooling jacket 11. This allows the laser light L to advance into the optical system main part 4 with its optical axis α coinciding with the optical axis β. The bottom wall 11b of the cooling jacket 11 and a housing 21 of the regulator 15 and optical system main part 4 are each formed with a through hole through which the laser light L passes.

A beam expander 22 for enlarging the beam size of the laser light L emitted from the laser head 13, an optical attenuator 23 for adjusting the output of the laser light L, an output observation optical system 24 for observing the output of the laser light L adjusted by the optical attenuator 23, and a polarization adjusting optical system 25 for adjusting the polarization of the laser light L are successively arranged on the optical axis β within the housing 21 of the optical system main part 4 from the upper side to lower side. A beam damper 26 for absorbing the eliminated part of laser light is attached to the optical attenuator 23, and is connected to the cooling jacket 11 by way of a heat pipe 27. This can prevent the beam damper 26 having absorbed the laser light from overheating. Thus, the laser light L emitted from the laser head 13 is adjusted to a predetermined characteristic in the optical system main part 4.

For observing the subject S mounted on the stage 2, a light guide 28 for guiding observation visible light is attached to the housing 21 of the optical system main part 4, whereas a CCD camera 29 is disposed within the housing 21. The observation visible light is guided by the light guide 28 into the housing 21, passes a field stop 31, a reticle 32, a dichroic mirror 33, etc. in succession, and then is reflected by a dichroic mirror 34 disposed on the optical axis β. The reflected observation visible light advances downward on the optical axis β and irradiates the subject S. The laser light L is transmitted through the dichroic mirror 34.

Then, the part of observation visible light reflected by the surface of the subject S advances upward on the optical axis β, so as to be reflected by the dichroic mirror 34. The light reflected by the dichroic mirror 34 is further reflected by the dichroic mirror 33, and is transmitted through an imaging lens 35, etc., so as to be made incident on the CCD camera 29. The image of the subject S captured by the CCD camera 29 is displayed on a monitor (not depicted). Thus, the light guide 28, CCD camera 29, field stop 31, reticle 32, dichroic mirrors 33 and 34, and imaging lens 35 constitute the subject observation optical system.

The objective lens unit 5 is detachably attached to the lower end portion of the optical system main part 4. The objective lens emit 5 is positioned with respect to the lower end portion of the optical system main part 4 by a plurality of positioning pins and thus can easily allow the optical axis β set in the optical system main part 4 and the optical axis β set in the objective lens unit 5 to coincide with each other. A processing objective lens 42 with its optical axis coinciding with the optical axis β is attached to the lower end of a housing 41 of the objective lens unit 5 by way of an actuator 43 using a piezoelectric device. The housing 21 of the optical system main part 4 and the housing 41 of the objective lens unit 5 are each formed with a through hole through which the laser light L passes. The peak power density of the laser light L converged by the processing objective lens 42 is at least $1 \times 10^8$ (W/cm$^2$) at the light-converging point P.

In order to position the light-converging point P at a predetermined depth from the surface of the subject S, a laser diode 44 for emitting measurement laser light and a light-receiving part 45 are disposed within the housing 41 of the objective lens unit 5. The measurement laser light is emitted from the laser diode 44, and then is successively reflected by a mirror 46 and a half mirror 47, so as to be reflected by a dichroic mirror 48 disposed on the optical axis β. The reflected measurement laser light advances downward on the optical axis β, and passes through the processing objective lens 42, so as to irradiate the subject S. The laser light L is transmitted through the dichroic mirror 48.

The part of measurement laser light reflected by the surface of the subject S reenters the processing objective lens 42 and advances upward on the optical axis β, so as to be reflected by the dichroic mirror 48. The measurement laser light reflected by the dichroic mirror 48 is transmitted through the half mirror 47, so as to be made incident on the light-receiving part 45 and collected on four divided position detecting devices into which a photodiode is equally divided. According to the light image pattern of measurement laser light collected on the four divided position detecting devices, it can be detected where the light-converging point of measurement laser light caused by the processing objective lens 42 is positioned with respect to the surface of the subject S.

Next, with reference to FIGS. 2 to 7, the regulator 15 disposed between the cooling jacket 11 and the optical system main part 4 will be explained in more detail. Here, X, Y, and Z axes are assumed to extend along the width, depth, and height of the cooling jacket 11.

Figure 2:
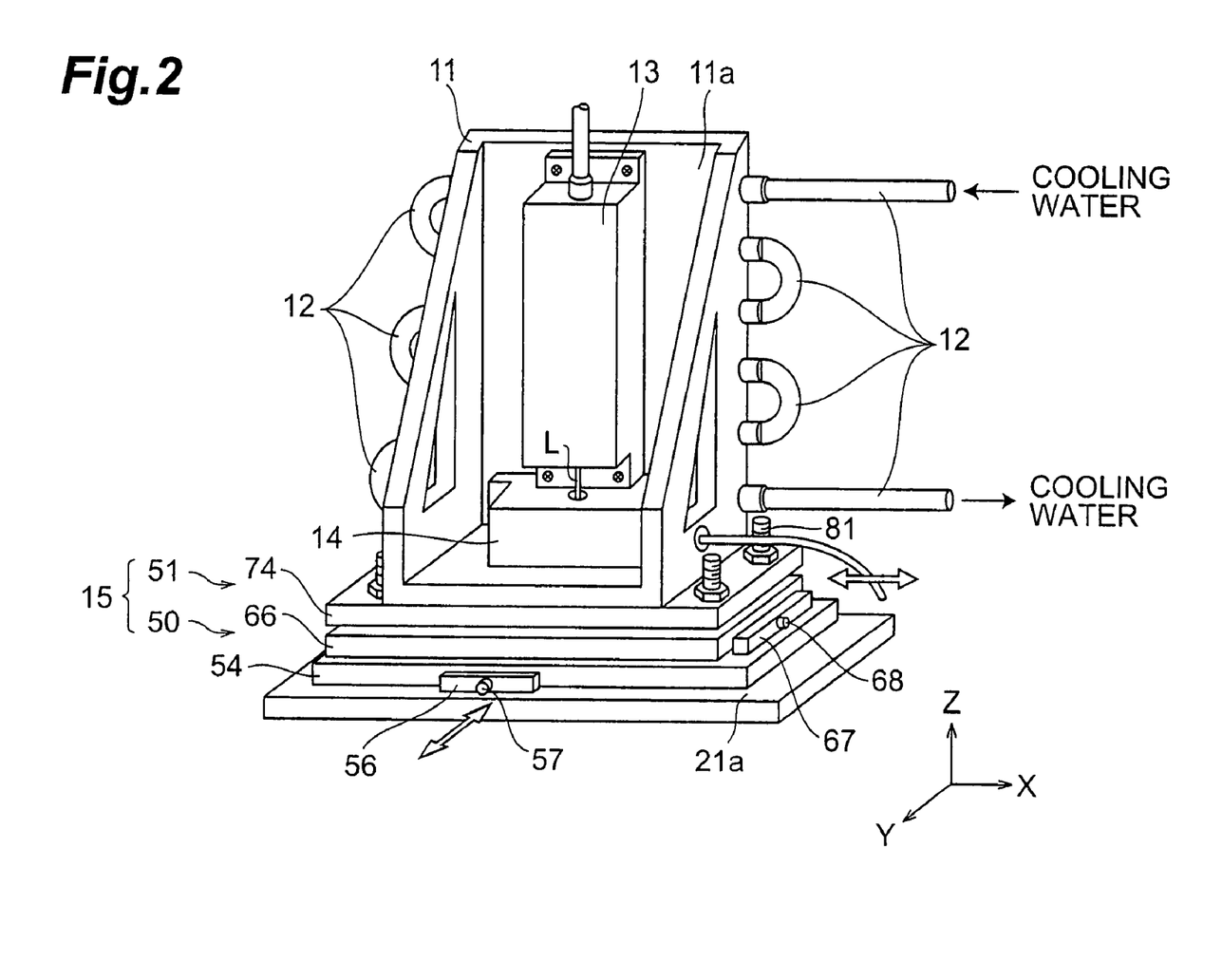
FIG. 2 is a perspective view of a laser head unit in the laser processing apparatus shown in FIG. 1.
Figure 3:
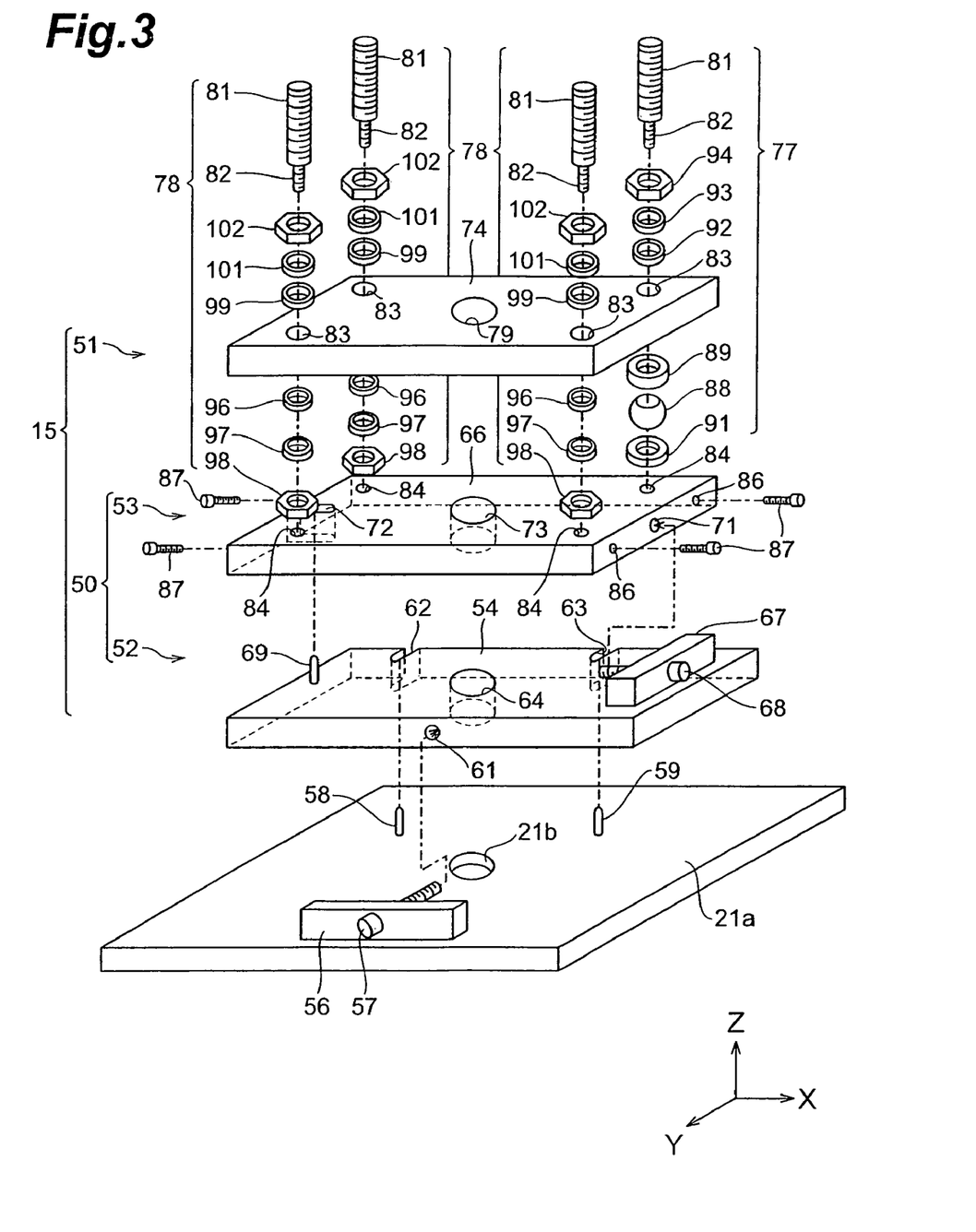
FIG. 3 is an exploded perspective view of a regulator shown in FIG. 2.

As shown in FIGS. 2 and 3, the regulator 15 is constituted by an X-Y direction correcting mechanism 50 for moving the cooling jacket 11 with respect to the optical system main part 4, and an inclination adjusting mechanism 51 for adjusting the inclination of the cooling jacket 11 with respect to the optical system main part 4. The X-Y direction correcting mechanism 50 is constituted by a Y-axis correcting mechanism 52 and an X-axis correcting mechanism 53, whereas the inclination adjusting mechanism 51 is set on the X-Y direction correcting mechanism 50.

The Y-axis correcting mechanism 52 comprises a planar member 54 having a rectangular form, a screw holder 56 formed at the front-side edge part on a top plate 21a of the housing 21, a feed screw 57 held along the Y axis by the screw holder 56, and a pair of pins 58, 59 erected on the top plate 21a. The front side face of the planar member 54 is formed with a screw hole 61, whereas the rear-side edge part of the planar member 54 is formed with a pair of cutouts 62, 63 each extending along the Y axis.

Figure 4:
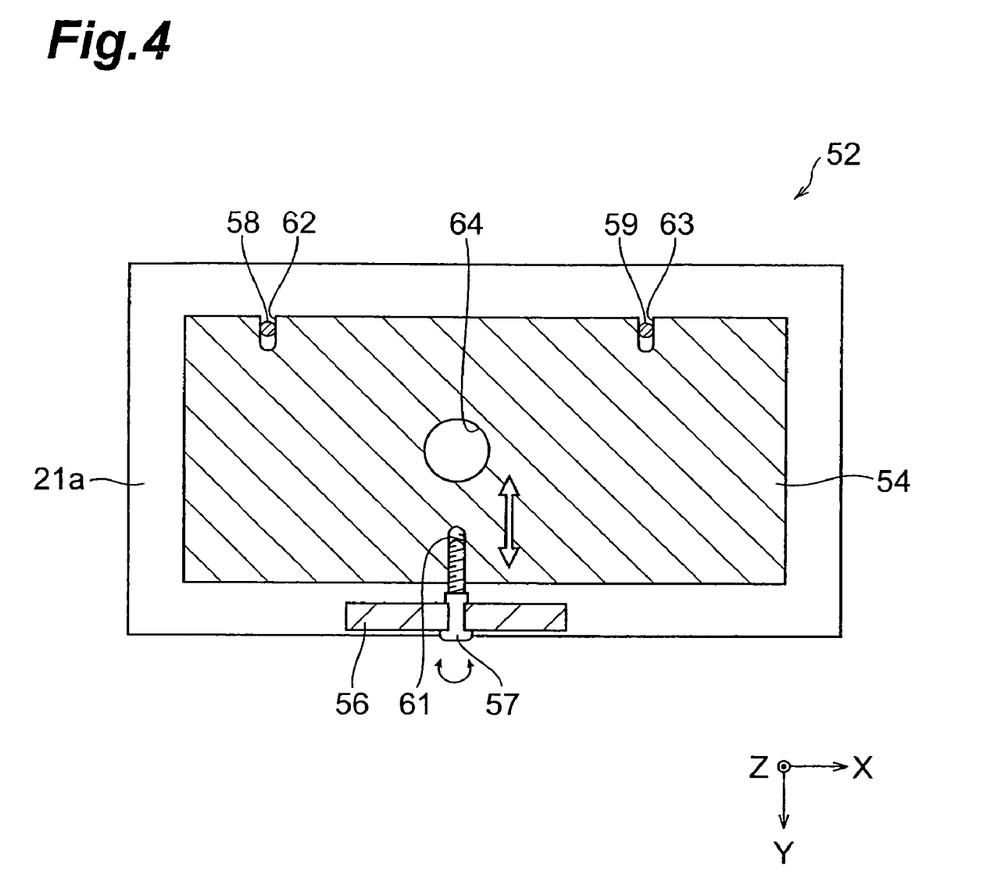
FIG. 4 is a horizontal sectional view of a Y-axis correcting mechanism.

As shown in FIGS. 3 and 4, the planar member 54 is mounted on the top plate 21a while the pins 58 and 59 are placed within the cutouts 62 and 63, respectively, whereas the feed screw 57 is in mesh with the screw hole 61. A through hole 21b for transmitting therethrough the laser light L emitted from the laser head 13 is formed at the center of the top plate 21a, whereas a through hole 64 for transmitting the laser light L therethrough is similarly formed at the center of the planar member 54.

The X-axis correcting mechanism 53 comprises a planar member 66 having a rectangular form, a screw holder 67 formed at the left-side edge part on the planar member 54, a feed screw 68 held along the X axis by the screw holder 67, and a pin 69 erected on the planar member 54. The left side face of the planar member 66 is formed with a screw hole 71, whereas the right-side edge part of the planar member 66 is formed with a cutout 72 extending along the X axis.

Figure 5:
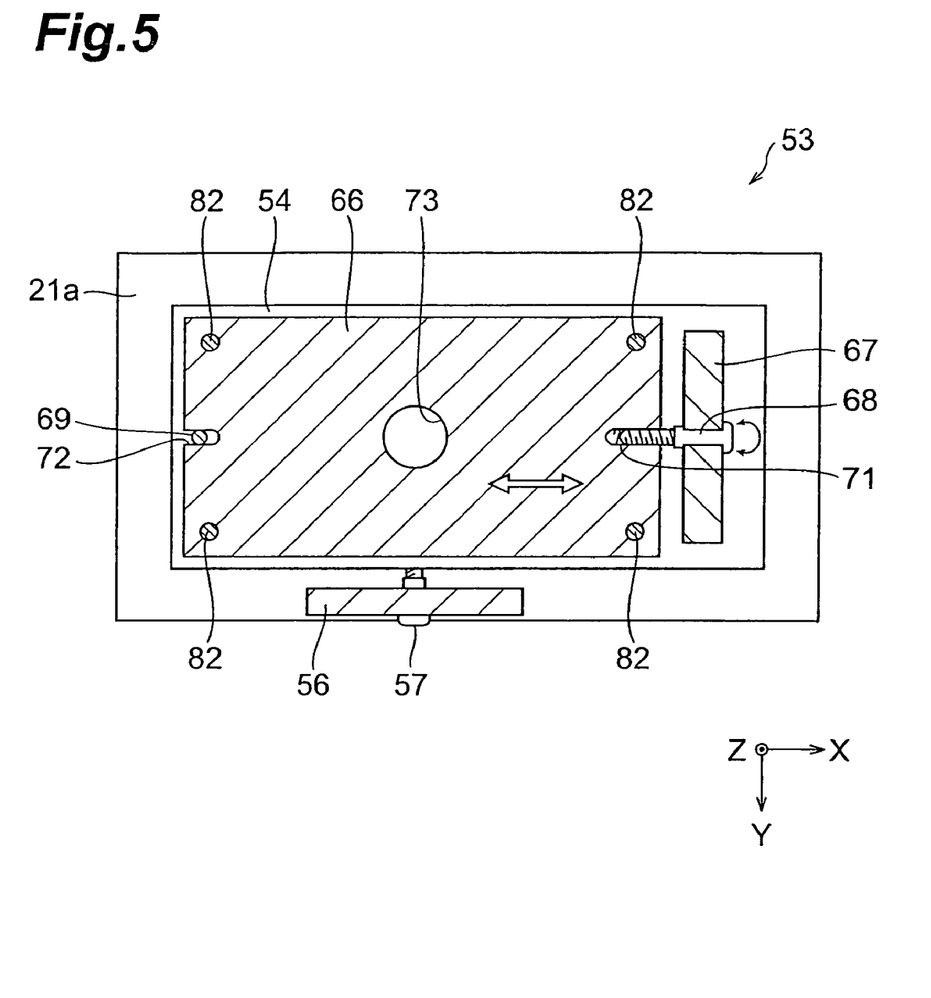
FIG. 5 is a horizontal sectional view of an X-axis correcting mechanism.

As shown in FIGS. 3 and 5, the planar member 66 is mounted on the planar member 54 while the pin 69 is placed within the cutout 72, whereas the feed screw 68 is in mesh with the screw hole 71. A through hole 73 for passing therethrough the laser light L emitted from the laser head 13 is formed at the center of the planar member 66.

As shown in FIG. 3, the inclination adjusting mechanism 51 is constituted by the planar member 66, a planar member 74 having a rectangular form, one inclination correcting fulcrum mechanism 77 and three inclination correcting movable point mechanisms 78 for connecting the planar members 66 and 74 to each other at four corners, respectively. A through hole 79 for transmitting therethrough the laser light L emitted from the laser head 13 is formed at the center of the planar member 74.

Figure 6:
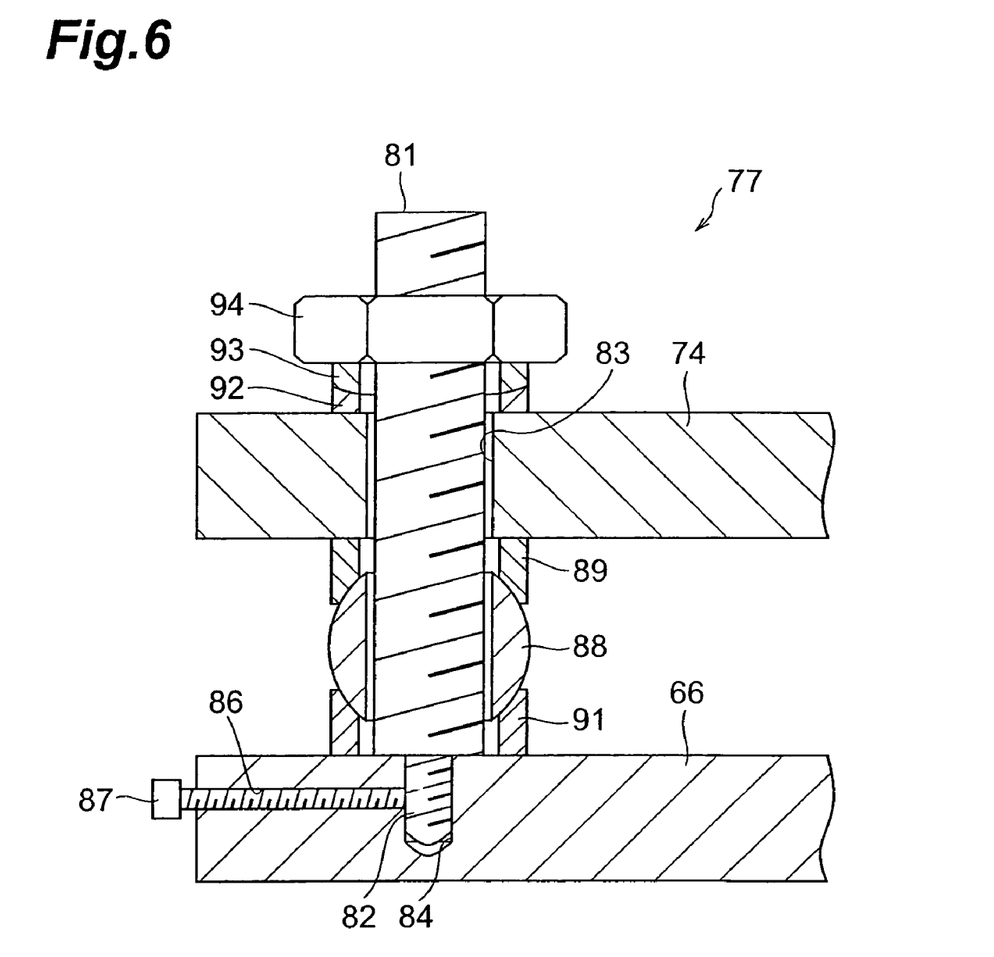
FIG. 6 is a vertical sectional view of an inclination correcting fulcrum mechanism shown in FIG. 2.

As shown in FIGS. 3 and 6, the inclination correcting fulcrum mechanism 77 includes a support bolt 81, whose leading end of the support bolt 81 is formed with a smaller-diameter screw part 82. The support bolt 81 penetrates through a screw insertion hole 83 of the planar member 74, whereas the smaller-diameter screw part 82 is in mesh with a screw hole 84 formed in the upper face of the planar member 66. A screw hole 86 is formed from a side face of the planar member 66 so as to penetrate through the screw hole 84. While the smaller-diameter screw part 82 of the support bolt 81 is in mesh with the screw hole 84, a fastening bolt 87 meshes with the screw hole 86, and the leading end of the fastening bolt 87 pushes the smaller-diameter screw part 82, whereby the support bolt 81 is firmly secured to the planar member 66.

Between the planar members 74 and 66, a ball 88 through which the support bolt 81 penetrates and spherical washers 89, 91 are disposed while the ball 88 is held between the spherical surfaces of the concave spherical washers 89, 91.

On the planar member 74, a concave spherical washer 92 and a convex spherical washer 93, through which the support bolt 81 penetrates, are disposed in mesh with each other, whereas a nut 94 is in mesh with the support bolt 81 on the upper side of the concave spherical washer 92 and convex spherical washer 93.

Figure 7:
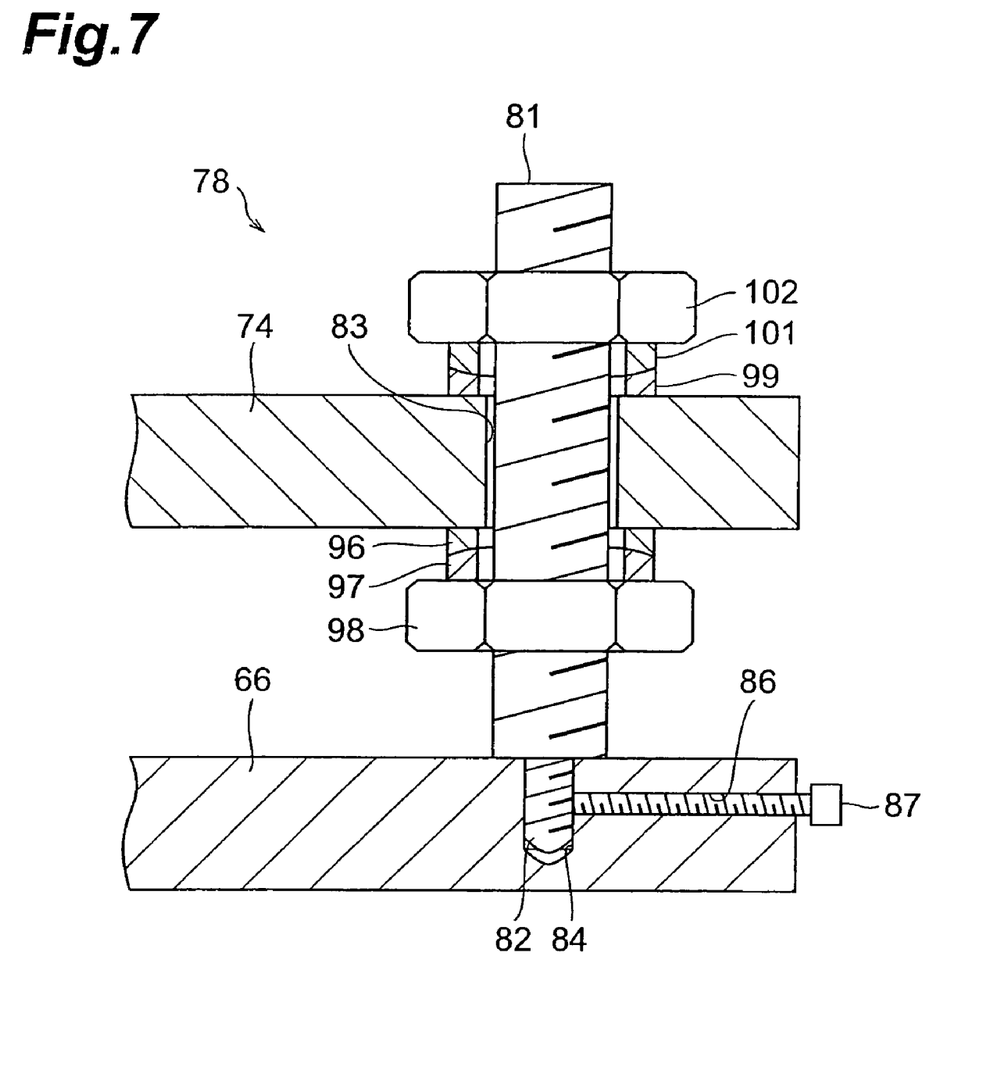
FIG. 7 is a vertical sectional view of an inclination correcting movable point mechanism shown in FIG. 2.

As shown in FIGS. 3 and 7, each inclination correcting movable point mechanism 78 includes a support bolt 81, whereas the support bolt 81 penetrates through a screw insertion hole 83 of the planar member 74, such that a smaller-diameter screw part 82 is in mesh with a screw hole 84 formed in the upper face of the planar member 66. While the smaller-diameter screw part 82 of the support bolt 81 is in mesh with the screw hole 84, a fastening bolt 87 meshes with a screw hole 86 formed at a side face of the planar member 66, so that the leading end of the fastening bolt 87 pushes the smaller-diameter screw part 82, whereby the support bolt 81 is firmly secured to the planar member 66.

Between the planar members 74 and 66, a concave spherical washer 96 and a convex spherical washer 97, through which the support bolt 81 penetrates, are disposed while in mesh with each other. On the lower side of the concave spherical washer 96 and convex spherical washer 97, a nut 98 is in mesh with the support bolt 81.

On the planar member 74, a concave spherical washer 99 and a convex spherical washer 101, through which the support bolt 81 penetrates, are disposed while in mesh with each other, whereas a nut 102 is in mesh with the support bolt 81 on the upper side of the concave spherical washer 99 and convex spherical washer 101.

An example of method of using thus configured regulator 15 will now be explained. This regulator 15 is used when replacing the laser head 13, etc.

When the feed screw 57 is rotated normally or in reverse, the planar member 54 moves along the Y axis while being guided by the pins 58 and 59 as shown in FIG. 4. Along with this movement, the X-axis correcting mechanism 53, inclination adjusting mechanism 51, and cooling jacket 11 located higher than the planar member 54 move along the Y axis relative to the top plate 21a, whereby the optical axis α of the laser head 13 and the optical axis β of the optical system main part 4 can coincide with each other along the X axis.

When the feed screw 68 of the X-axis correcting mechanism 53 is subsequently rotated normally or in reverse, the planar member 66 moves along the X axis while being guided by the pin 69 as shown in FIG. 5. Along with this movement, the inclination adjusting mechanism 51 and cooling jacket 11 located higher than the planar member 66 move along the X axis relative to the top plate 21a, whereby the optical axis α of the laser head 13 and the optical axis β of the optical system main part 4 can coincide with each other along the Y axis.

Figure 8:
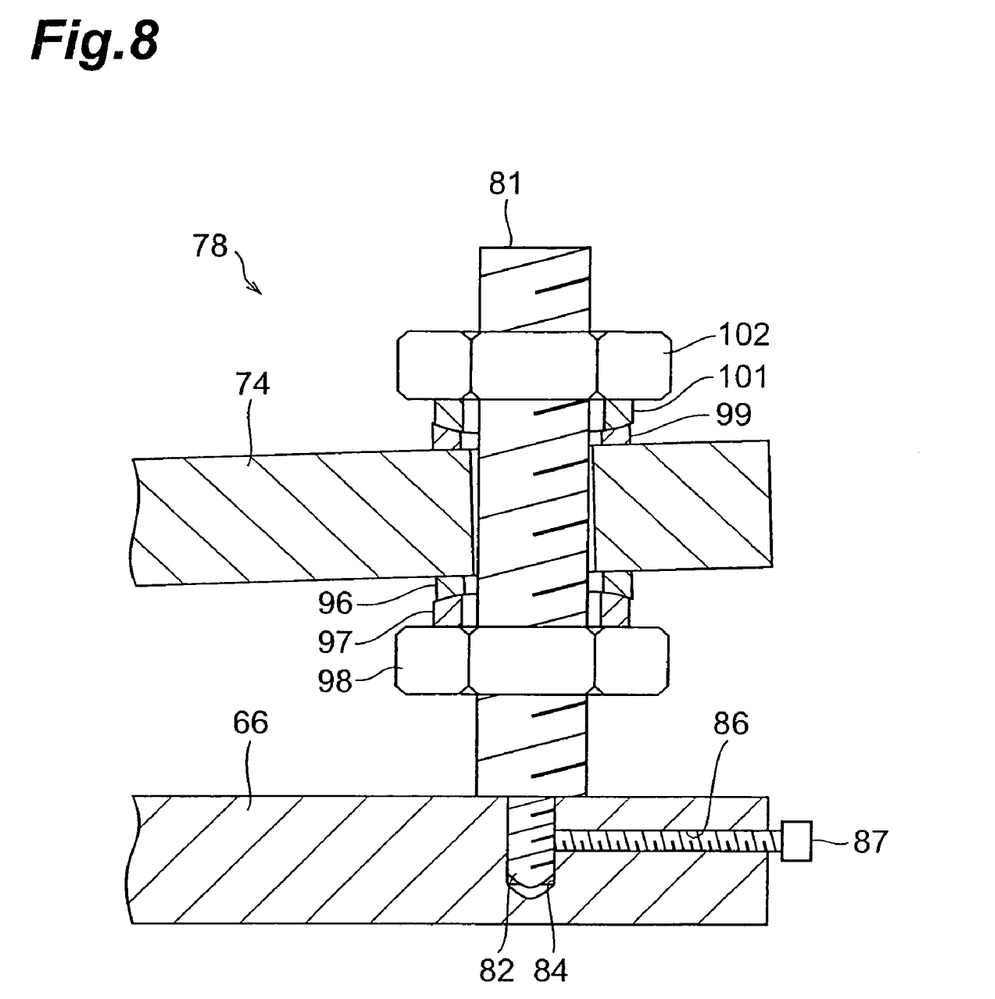
FIG. 8 is a vertical sectional view of a state where a planar member is tilted in the inclination correcting movable point mechanism shown in FIG. 7.

Further, the nut 94 in the inclination correcting fulcrum mechanism 77 and the nuts 98, 102 of each inclination correcting movable point mechanism 78 are loosened in the inclination adjusting mechanism 51 (see FIGS. 6 and 7). Then, the planar member 74 to which the cooling jacket 11 is secured is tilted such that the optical axis α of the laser head 13 and the optical axis β of the optical system main part 4 coincide with each other. Here, in the inclination correcting fulcrum mechanism 77, the planar member 74 is tilted while the respective concave spherical surfaces of the concave spherical washers 89, 91 slide against the spherical surface of the ball 88, and the concave spherical surface of the concave spherical washer 92 and the convex spherical surface of the convex spherical washer 93 slide against each other. In each inclination correcting movable point mechanism, as shown in FIG. 8, the convex spherical surface of the convex spherical washer 97 and the concave spherical surface of the concave spherical washer 96 slide against each other, and the concave spherical surface of the concave spherical washer 99 and the convex spherical surface of the convex spherical washer 101 slide against each other. In a state where the inclination of the planar member 74 is optimized, the nut 94 of the inclination correcting mechanism 77 is fastened downward while the nuts 98, 102 of each inclination correcting movable point mechanism 78 are fastened toward the planar member 74 from both sides, whereby the planar member 74 is secured.

Thus, using the inclination adjusting mechanism 51 can adjust the inclination of the planar member 74. Here, the cooling jacket 11 is attached onto the planar member 74, whereas the laser head 13 is attached to the cooling jacket 11. Therefore, the inclination of the laser head 13 can be adjusted when the inclination of the planar member 74 is adjusted by the inclination adjusting mechanism 51.

When the position and inclination of the laser head 13 with respect to the optical system main part 4 is adjusted by using the X-Y direction correcting mechanism 50 and inclination adjusting mechanism 51, the optical axis α of the laser head 13 and the optical axis β of the optical system main part 4 can coincide with each other as in the foregoing. Therefore, even when the emitting direction of the laser light L fluctuates among laser heads, the regulator 15 can easily correct the fluctuation in laser light emitting direction among the laser heads 13 each time the laser heads 13 are exchanged. The optical axis adjustment using the regulator 15 can also be carried out when the laser head 13 is replaced together with the cooling jacket 11.

Though the present invention is specifically explained with reference to the embodiment in the foregoing, the present invention is not limited to the above-mentioned embodiment. For example, motors may be provided so that the feed screw 57 of the Y-axis correcting mechanism 52 and the feed screw 68 of the X-axis correcting mechanism 53 are rotated by electric power. While the inclination correcting movable point mechanisms 96 are provided at three of the four corners connecting the planar members 74 and 66 to each other in the above-mentioned embodiment, those disposed at any two corners can stably connect the planar members 74 and 66 to each other. Though the optical system main part 4 and the objective lens unit 5 are separated from each other in the above-mentioned embodiment, this is not restrictive, whereby the laser processing apparatus may have a structure in which the optical system main part 4 is integrated with the objective lens unit 5.

INDUSTRIAL APPLICABILITY

The present invention can correct the fluctuation in laser light emitting direction among laser heads.

The invention claimed is:

1. A laser processing apparatus for processing a subject to be processed by irradiating the subject with laser light, the apparatus comprising:
   a laser head for emitting laser light;
   a cooling jacket for holding and cooling the laser head;
   an optical system main part for adjusting the laser light emitted from the laser head to a predetermined characteristic; and
   a regulator, disposed between the cooling jacket and optical system main part on an optical axis of the laser head and an optical axis of the optical system main part, for adjusting a position and inclination of the cooling jacket with respect to the optical system main part such that the optical axis of the laser head coincides with the optical axis of the optical system main part.

* * * * *